US005534105A

United States Patent [19]

Boyd

[11] Patent Number: 5,534,105

[45] Date of Patent: Jul. 9, 1996

[54] METHOD AND APPARATUS FOR SEALING APPLIED SCENT SLURRY DURING THE PRINTING PROCESS

[76] Inventor: Craig A. Boyd, 109-8, Bucks Hill Rd., Waterbury, Conn. 06704

[21] Appl. No.: 257,298

[22] Filed: Jun. 9, 1994

Related U.S. Application Data

[63] Continuation-in-part of Ser. No. 45,111, Apr. 12, 1993, abandoned.

[51] Int. Cl.[6] .......................... B32B 31/08; B32B 31/12; B32B 35/00

[52] U.S. Cl. .......................... 156/324; 156/277; 156/278; 156/291; 156/306.3; 156/351; 156/352; 156/358; 156/361; 156/365; 156/367; 156/368; 156/378; 156/504; 156/543

[58] Field of Search ............................ 428/905; 156/277, 156/278, 290, 291, 324, 351, 352, 358, 361, 364, 365, 367, 368, 378, 504, 543, 553, 554, 555; 226/11, 100

[56] References Cited

U.S. PATENT DOCUMENTS

| | | | |
|---|---|---|---|
| 2,154,474 | 4/1939 | Scott . | |
| 2,818,904 | 1/1958 | Ambrose . | |
| 3,239,396 | 3/1966 | Bohannon, Jr. . | |
| 3,516,617 | 6/1970 | Haner et al. . | |
| 3,928,844 | 12/1975 | Meihofer | 226/11 |
| 3,948,715 | 4/1976 | Tokuno . | |
| 3,967,994 | 7/1976 | Langberg . | |
| 3,977,929 | 8/1976 | Evans . | |
| 4,145,001 | 3/1979 | Weyenberg et al. | 428/905 X |
| 4,165,842 | 8/1979 | Mengel . | |
| 4,225,379 | 9/1980 | Ishii et al. . | |
| 4,238,261 | 12/1980 | Tetro | 156/358 X |
| 4,243,464 | 1/1981 | Potchen et al. | 156/555 X |
| 4,493,065 | 1/1985 | Sword, Jr. | 226/11 X |
| 4,518,127 | 5/1985 | Hurst . | |
| 4,620,184 | 10/1986 | Nedstedt | 226/11 X |
| 4,751,934 | 6/1988 | Moir et al. . | |
| 4,792,103 | 12/1988 | Schoonderbeek . | |
| 4,808,454 | 2/1989 | Saitoh | 156/244.11 X |
| 4,869,436 | 9/1989 | Mobley . | |
| 4,934,621 | 6/1990 | Jacobs . | |
| 4,986,485 | 1/1991 | Soubrier et al. . | |
| 4,990,215 | 2/1991 | Anderson . | |
| 4,995,936 | 2/1991 | Cohn . | |
| 5,045,134 | 9/1991 | Schenker et al. . | |
| 5,061,337 | 10/1991 | Fraser | 156/378 X |
| 5,160,399 | 11/1992 | Ueda et al. . | |
| 5,391,420 | 2/1995 | Bootman et al. | 428/905 X |

FOREIGN PATENT DOCUMENTS

| | | |
|---|---|---|
| 2724799 | 12/1978 | Germany . |

*Primary Examiner*—David A. Simmons
*Assistant Examiner*—M. Curtis Mayes
*Attorney, Agent, or Firm*—Richard C. Litman

[57] ABSTRACT

A method and apparatus for impermeably sealing microencapsulated or other scent slurry during the printing process. The method comprises the application of an impermeable overlay sheet over the scent slurry on a continuous web of material, using double-sided tape or other adhesive means along the periphery of the overlay sheet. Preferably an impermeable metallic foil is used for the overlay, but other impermeable sheet material (e.g., plastic sheet) may be used. The apparatus continually feeds and applies the impermeable overlay sheet also disclosed. A second, similar apparatus may be provided to mirror the first apparatus, in order to apply a second impermeable overlay sheet to the opposite surface of the scent slurry coated web, thereby preventing bleed through of the scent and/or other chemicals. The above method and apparatus provide for the impermeable sealing of the scent slurry used for advertising in magazines and the like, providing advantages for persons allergic to various chemicals which may be used in such slurries, and also substantially preventing the mixing of the scent slurry with paper, ink or other odors in the printed matter.

18 Claims, 5 Drawing Sheets

METHOD AND APPARATUS FOR SEALING APPLIED SCENT SLURRY DURING THE PRINTING PROCESS

REFERENCE TO RELATED PATENT APPLICATION

This application is a continuation in part of U. S. patent application Ser. No. 08/045,111, filed on Apr. 12, 1993 now abandoned.

FIELD OF THE INVENTION

The present invention relates generally to automated printing processes, and more specifically to a method and apparatus for sealing the fragrance of a scent slurry (e.g., "Scratch and Smell," ™) applied to a sheet of material during the printing process.

BACKGROUND OF THE INVENTION

Relatively recently, the technology has developed for the incorporation of scent samples within the pages of printed matter. Advertisers have made Great use of this technology to publicize new perfumes, lotions, after shaves, etc; virtually any product which may be considered to have a pleasant scent. The process is known as scent microencapsulation, whereby the scent particles are encapsulated in a myriad of relatively impervious tiny capsules or bubbles which serve to enclose the scent until such time as it is released by breaking the microcapsules; hence the term, "Scratch And Smell" (™).

However, in practice it has been found that the sealing of the scent by the microencapsulation process is generally less than perfect, and the odor of the scent incorporated into the printed matter (magazine, etc.) often permeates the surrounding area even when the scent microcapsules have not been deliberately damaged. Many persons find that the odor of many of these scent products, when combined with the odor of the fresh paper upon which the scent slurry has been applied, is rather objectionable and can be somewhat medicinal in fragrance, thus destroying the sensation which the advertisers intend to convey. Moreover, many persons are allergic to some of the natural or synthetic scent compounds used in this technology and would prefer to avoid any inhalation or contact with the material if at all possible.

The need arises for a more positive method of sealing such microencapsulated scent slurry in printed matter by means of an adhesively applied impervious sheet overlay, and an apparatus for providing such positive sealing. The apparatus must be capable of continuous operation in order to be compatible with the industrial printing process, and must be adaptable to current printing processes and machinery without need for extensive modification of the printing process. The method and apparatus may be applied to both sides of the scent slurry coated web, to more completely seal the scent and completely eliminate bleed-through of any scent and/or chemicals.

DESCRIPTION OF THE PRIOR ART

U.S. Pat. No. 2,154,474 issued to Clyde Scott on Apr. 18, 1939 discloses an Apparatus For Winding Film in which a cellulose film is adhesively applied to one or both sides of a sheet of paper. The film is laminated to the paper continually and completely across its width, unlike the peripheral sealing of the present means. The continuous pinch rollers of Scott provide uniform and relatively high pressure completely across the paper and film, and would tend to crush the microencapsulations of the scent slurry; such apparatus is not adaptable to the peripheral attachment of the impervious sheet used in the present invention.

U. S. Pat. No. 2,818,904 issued to Francis X. Ambrose on Jan. 7, 1958 discloses a Press For Webs in which discontinuous, rectilinear mats of fiber glass are impregnated with resin and squeezed between pinch rollers to force the resin into the fibers. It is not seen how the Ambrose apparatus could be applied to the present invention, where the high pressures developed by the Ambrose apparatus would crush the microencapsulations. Again, the Ambrose process is continuous across the rollers, rather than sealing a sheet only at its periphery, as in the present invention.

U.S. Pat. No. 3,239,396 issued to William D. Bohannon. Jr. on Mar. 8, 1966 discloses Methods Of And Apparatus For Laminating Elongated Members, comprising provision for completely coating and encasing plural electrical wires or conductors in plastic. Bohannon teaches the use of grooved rollers to Guide the wiring accurately, but otherwise the laminated coating is applied uniformly across the entire span of the wiring. The Bohannon, Jr. apparatus and method are unrelated to the peripheral adhesive application of an impermeable sheet to an underlying sheet.

U. S. Pat. No. 3,516,617 issued to Lambert Haner et al. on Jun. 23, 1970 discloses a Digital System For Automatic Splice Control which provides for the matching of linear speed of the two webs being spliced, and other features. The Haner et al. apparatus is beyond the scope of the present invention, which resides in the peripheral adhesive sealing of scent impervious sheet material to one or both sides of a web of sheet material. While the present invention may make use of splicing webs of material, such process is not central to the invention.

U.S. Pat. No. 3,948,715 issued to Masateru Tokuno on Apr. 6, 1976 discloses an Auto-Detecting Means For Detecting Drawnout Termination End Of Old Paper Roll And Beginning End Of New Paper Roll In Paper Splicing Apparatus. Again, such process is not central to the present invention.

U.S. Pat. No. 3,967,994 issued to Edwin Langberg on Jul. 6, 1976 discloses a Method Of Inspection For Splices Used For Joining Webs In A Manufacturing Process. The method resides in the microwave detection of splices in web material wound on spools or reels, and has no bearing upon the present invention.

U.S. Pat. No. 3,977,929 issued to Donald J. Evans on Aug. 31, 1976 discloses a Corrugator, in which a corrugated sheet is laminated to a backing sheet. The process is continuous across the width of the web, unlike the peripheral adhesive attachment of the present impervious sheets to the web material, While Evans provides a web break detector, such apparatus is not central to the present invention.

U. S. Pat. No. 4,165,842 issued to William R. Mengel on Aug. 28, 1979 discloses an Apparatus For Replacing Rotating Mandrels On Which A Web Is Wound. The device physically transfers a second spool of material into position when the first spool is depleted, unlike the apparatus of the present invention, and no means is provided for the overlay of material onto a printed sheet.

U. S. Pat. No. 4,225,379 issued to Tsuneji Ishii et al. on Sep. 30, 1980 discloses a Method Of Laminating Plastic Film And Shaped Metal Substrates in which a plastic coating is laminated to a metal article. The present invention does not use a laminating technique, but seals the periphery of an impervious sheet over an underlying scent slurry coated portion of web material.

U. S. Pat. No. 4,518,127 issued to Peter Hurst on May 21, 1985 discloses a Web Splicing Apparatus including two reels in a vertical relationship. However, Hurst relates to the beginning of the printing process, rather than an inline station such as the apparatus of the present invention. No means is provided by Hurst for adhesively securing an impervious sheet to a web of material.

U.S. Pat. No. 4,792,103 issued to Hubertus J. Schoonderbeek on Dec. 20, 1988 discloses a Device For Splicing Two Webs Of Material Each Originating From A Roll. At least one set of chucks for the support of one roll of material are capable of horizontal travel, unlike the present invention. Moreover, no means is provided for the overlay of an impervious material to a printed sheet.

U. S. Pat. No. 4,869,436 issued to George A. Mobley on Sep. 26, 1989 discloses a Laminator Unwind Roll Stand providing for the splicing of a second roll to a depleted first roll end while in movable operation. The second roll travels downward to take the place of the depleted first roll as the empty spool of the first roll drops away, unlike the present invention. No means is provided for the overlay of an impervious material to a printed sheet, as in the case of the present invention.

U. S. Pat. No. 4,934,621 issued to Thomas G. M. Jacobs on Jun. 19, 1990 discloses a Device For Continuously Feeding A Web Of Material From A Stock Roll wherein the first and second roll spools travel along a U-shaped path during the operation. No means for the overlay of impervious material to a printed sheet is disclosed.

U.S. Pat. No. 4,986,485 issued to Pierre Soubrier et al. on Jan. 22, 1991 discloses an Automatic Foil Change Unit wherein four rolls of material are rotatably installed upon a carousel. No means is provided for the overlay of an impervious material onto a printed sheet.

U.S. Pat. No. 4,990,215 issued to Conrad V. Anderson on Feb. 5, 1991 discloses a Web-Aligning Apparatus providing for the lateral movement of a supply roll to provide the proper lateral alignment of the web, to ensure accurate alignment for splicing and other purposes. The apparatus is beyond the scope of the present invention, and fails to disclose any means for adhesively securing an impervious sheet about the periphery of a scent slurry coating on an underlying web of material.

U. S. Pat. No. 4,995,936 issued to Robert Cohn on Feb. 26, 1991 discloses a Continuous Web Splicing Machine providing for the splicing of printing web material prior to further printing operations. The apparatus is at the head of the printing line, rather than being inline as with the present apparatus and method. Again, no means is disclosed for overlaying an impervious material onto a printed sheet as provided by the present invention.

U.S. Pat. No. 5,045,134 issued to Thomas Schenker et al. on Sep. 3. 1991 discloses a Method For Splicing Trailing And Leading Ends Of Sheets directed to sheets formed into packing tubes for the packaging of goods therein. The basic concept is similar to other web splicing devices, as discussed above. Again, the operation takes place at the beginning of the line, rather than inline, as in the case of the present invention. It is not seen how the Schenker et al. apparatus or method could be applied to the scent slurry sealing method and apparatus of the present invention.

U.S. Pat. No. 5,160,399 issued to Noriyoshi Ueda et al. on Nov. 3, 1992 discloses a Laminating Apparatus providing heating means for drying the article to be laminated. The application of heat and pressure, as taught by Ueda et al., to the process of the present invention, would destroy the scent slurry microencapsulations and hence is not adaptable to the present invention.

Finally, German Pat. No. 2,724,799 to Agfa-Gevaert AG and published on Dec. 7, 1978 discloses a Faulty Film Splice Detector including alarm means when separation of a film splice is detected. Such alarm means is not central to the present invention, and the German Patent '799 does not teach any peripheral sealing of one sheet to another or to a web of material.

None of the above noted patents, taken either singly or in combination, are seen to disclose the specific arrangement of concepts disclosed by the present invention.

SUMMARY OF THE INVENTION

By the present invention, an improved method and apparatus for sealing a microencapsulated scent slurry during the printing process is disclosed.

Accordingly, one of the objects of the present invention is to provide an improved method for sealing a scent slurry which may be applied as an added step in the printing process without disrupting other printing steps.

Another of the objects of the present invention is to provide an improved method for sealing a scent slurry which results in an impermeable but removable seal over the slurry.

Yet another of the objects of the present invention is to provide an improved apparatus for use in the above method.

Still another of the objects of the present invention is to provide such an improved apparatus which is capable of continually feeding an overlying impermeable sheet to such scent slurry on a printed or other sheet of material.

A further object of the present invention is to provide an improved apparatus which is usable with foil and/or other impermeable plastic sheet material.

An additional object of the present invention is to provide an improved method and apparatus which provides for the peripheral sealing of an overlying impermeable sheet to a web of material having a scent slurry applied thereto, to seal the scent slurry within the adhesive periphery of the impermeable sheet.

Another object of the present invention is to provide an improved method and apparatus which provides for the peripheral sealing of a second impermeable sheet to the opposite side of a web of material having a scent slurry applied thereto, to sandwich the area of scent slurry between the first and second peripherally sealed impermeable sheets.

Yet another object of the present invention is to provide an improved method and apparatus for the purposes described which is inexpensive, dependable and fully effective in accomplishing its intended purpose.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

Similar reference characters denote corresponding features consistently throughout the several figures of the attached drawings.

DETAILED DESCRIPTION OF THE PREFERRED EMBODIMENTS

Figure 1:
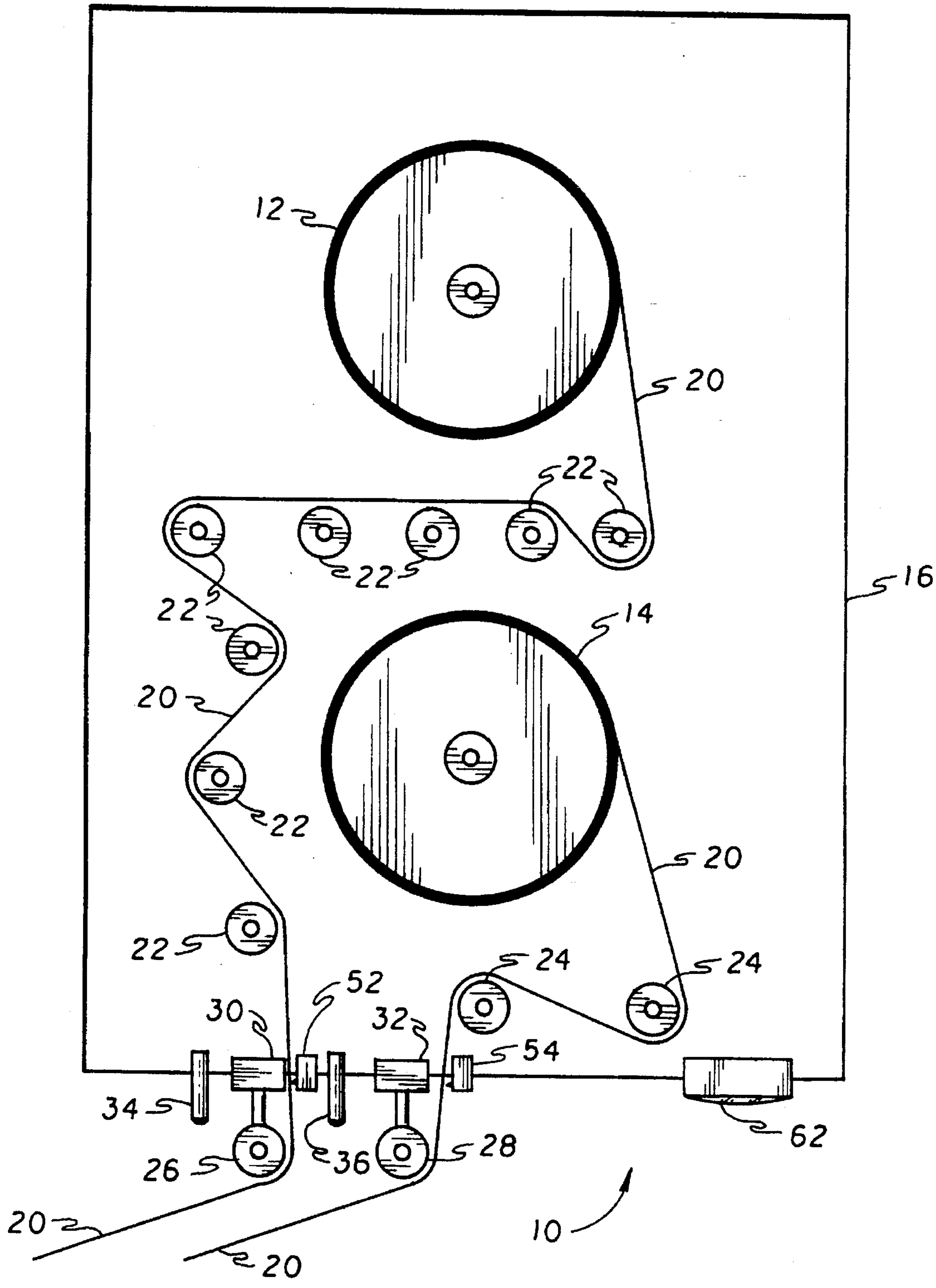
FIG. 1 is a schematic side view of the impermeable sheet dispensing apparatus of the present invention, showing its internal components.

Referring now to the drawings, the present invention will be seen to relate to a method and apparatus for adhesively sealing a scent slurry applied during the printing process. The use of such scent slurries for advertising and/or other purposes, in magazines and other printed matter, has become increasingly popular, and although these scent slurries are generally microencapsulated (i.e., sealed with microscopic capsules in order to prevent the dilution of the scent before its intended release), such microencapsulation oftentimes allows at least some of the scent to escape. The present invention provides for the more complete sealing of such microencapsulated scent slurry, as will be shown below.

FIG. 1 discloses the impervious sheet dispensing apparatus 10 of the present invention. Dispenser 10 provides for the containment of a first sheet dispensing spool 12 and a second sheet dispensing spool 14, installed vertically one above the other on fixed axes within a cabinet 16. The installation of spools 12 and 14 in a vertical array provides for the ease of removal of an empty spool and the installation of a new, full spool when needed. Spools 12 and 14 are accessible from the front of dispenser 10 by means of a door 18. (Door 18 is removed for clarity in FIG. 1, but is partially shown in FIG. 2.)

Spools 12 and 14 each contain a roll of scent impervious sheet material 20, which is dispensed from either spool 12 or 14 as needed by means of first dispensing rollers 22 and second dispensing rollers 24. Impervious sheet material 20 is preferably a thin aluminum foil or sheet, but other materials (e. g., polyethylene plastic, Mylar (TM) or other plastic films) may be used as desired or required.

Dispensing rollers 22 and 24 respectively, serve to regulate the passage of impervious sheet 20 from either the first spool 12 or the second spool 14, as appropriate, to the first and second application rollers 26 and 28. These rollers 26 and 28 are best seen in FIG. 17 roller 28 and the structure associated with that roller 28 and roller 26 has been deleted from FIG. 2 for clarity in showing the process of the present invention. Adjustment means 30 and 32 are respectively provided for the adjustment of the first and second application rollers 26 and 28. Adjustment means 30 and 32 may be hydraulically or pneumatically actuated, operated by means of electrically threaded actuation, etc.

The feed of sheet material 20 from either the first spool 12 or the second spool 14 is controlled by means of a first sensor 34 and a second sensor 36, which sensors 34 and 36 respectively, determine when the material 20 is depleted from either the first or second spool 12 or 14. Sensors 34 and 36 may be photoelectrically operated, or alternatively may use mechanical fingers (not shown) to sense the passage of the end of the roll of material 20 from either spool 12 or 14.

Figure 2:
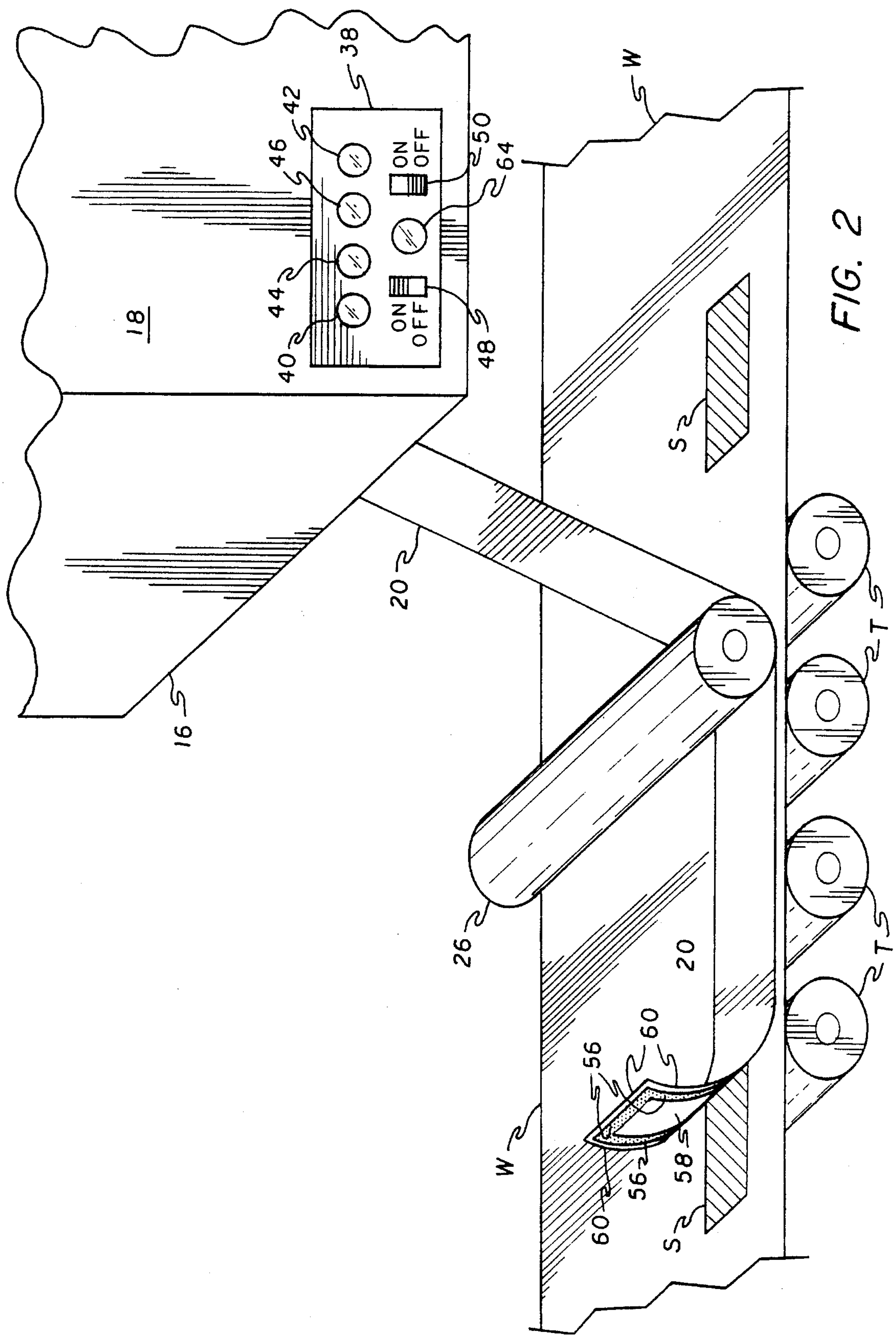
FIG. 2 is a perspective view of the impermeable sheet overlay apparatus and process of the present invention.

A control panel 38, shown on the cabinet door 18 in FIG. 2, is provided for an operator to control the operation of dispenser 10 and contains first and second splice indicators 40 and 42, first and second sheet detector indicators 44 and 46, and first and second power switches 48 and 50, with each first and second indicator or switch respectively, relating to the first or second spool 12 or 14. Cutting knives 52 and 54 (FIG. 1) are provided to respectively cut and trim the ends of the first roll of material 12 or the second roll 14, when each respective roll is depleted. Knives 52 or 54 may be activated simultaneously with the startup and shutdown of the first or second rolls 12 and 14.

The apparatus of the present invention operates in accordance with the steps described in the flow chart of FIG. 5, described further below. When a first spool 12 is depleted, the first sensor 34 will detect the end of the sheet 20 of the first spool 12, trim the end by means of knife 52, and automatically start the second spool 14 and its impervious sheet material 20 and adhesively splice or tape that sheet to the first sheet 20, assuming that the first power switch 48 is in the "on" position: the "on" positions for each power switch 48 and 50 are respectively, indicated by means of splice indicators 40 and 42. When the above automated operation occurs, the first detector indicator 44 will flash to indicate the depletion of the first spool 12 and the start up and splicing of the second spool 14. When this occurs, the operator deactivates the first spool. 12 by turning off the first power switch 48, at which time the remnant end (if any) of spool 12 is cut by means of knife 52, and removes the depleted spool 12 and replaces it with a full spool to continue the operation while the second spool 14 is feeding impervious sheet material 20. When a full first spool is installed, the first power switch 48 is reactivated in preparation for the depletion of the second spool 14. The splicing of the replenished first spool to the depleted second spool is accomplished as described above, with the appropriate lights and switches reversed in operation.

The overall operation of the method and apparatus of the present invention is shown in FIG. 2 of the drawings. In figure 2, a web or sheet of printed or other material W traverses travel rollers T during the printing process as indicated by the directional arrow: applications of scent slurry S have already been applied to the web W as indicated. Impervious sheet material 20 of appropriate width (i.e., sufficient to laterally span the applied slurry areas S with a margin) is dispensed from the sheet dispenser 10, which dispenser 10 is installed above the travel rollers T as indicated, in an appropriate place along the production line and downstream of the point of application of the scent slurry S to the web W. Sheet 20 will have had a pattern of adhesive 56, such as a double-sided tape, or other adhesive means applied to the mating side 58 of the sheet 20 along the peripheral edge 60 thereof and positioned so as to be in registry with the applied slurry S, prior to winding upon the spool 12 or 14. It will be understood that the application of sheet 20 to web W is a continuous process, and that the sheet 20 and web W will be in continuous facing registry with one another. The sheet 20 is shown lifted from the web W in FIG. 2 in order to show the applied slurry S and the peripheral adhesive means 56 are in registry with and facing the applied slurry S. It will be further understood that the adhesive means 56 is positioned to adhere to the web W immediately adjacent to the edge of the slurry area S, and is not adhered to the slurry S itself.

As the impervious sheet 20 is dispensed by means of dispenser 10 and an application roller such as first roller 26, the sheet 20 is adhesively secured to the web W by means of the adhesive 56 peripherally applied to the area of sheet 20 which is in registry with and covers the applied slurry So Any excess amount of sheet material 20 which does not directly cover and seal the slurry area S, may be trimmed and removed at a later step in the production process.

The above described process provides for the continuous application of foil or sheet material 20 to overlie and seal the previously applied scent slurry material S on a web W. So long as the above process operates normally, the dispensing apparatus 10 may operate continually. However, from time to time the primary web or sheet material W will break during production, at which time it is necessary to essentially shut down the operation temporarily in order to splice and feed the web material W through the process machinery to resume the operation. If no provision is made for stopping the operation of ancillary equipment, such as dispenser 10, then a great waste of material such as impervious sheet 20 can occur. The apparatus of the present invention provides for the stoppage of the dispenser 10 by means of a sensor or detector 62, shown in FIG. 1. Sensor 62 may operate on a photoelectric or other principle in the manner of sensors 34 and 36, and serves to detect any breakage or discontinuity in the primary web sheet W. If such a breakage occurs, sensor 62 will detect it and automatically shut down the feed of impervious sheet material 20 from dispenser 10. Simultaneously, sensor 62 will activate a warning indicator 64 on the control panel 38, to alert the operator that a web break has been detected and that the dispenser apparatus 10 has accordingly been shut down. Once the web break has been corrected or spliced, the dispensing apparatus 10 may be started using switches 48 and/or 50 as described above.

The above described apparatus and process ensure the positive sealing of any scent slurry applications S on a printed web of material W, to preclude the inadvertent release of chemicals and/or odors therefrom. However, it has been found that in some cases, the chemicals and/or scents from such slurries may bleed through or permeate the web W of paper or other material, and be noticeable from the opposite side or surface of the web W. Accordingly, a second embodiment of the above described apparatus may provide for the sealing of the opposite surface or side of the web W, in order to sandwich the slurry S and portion of the web W to which it has been applied, between two impervious sheets of material.

Figure 3:
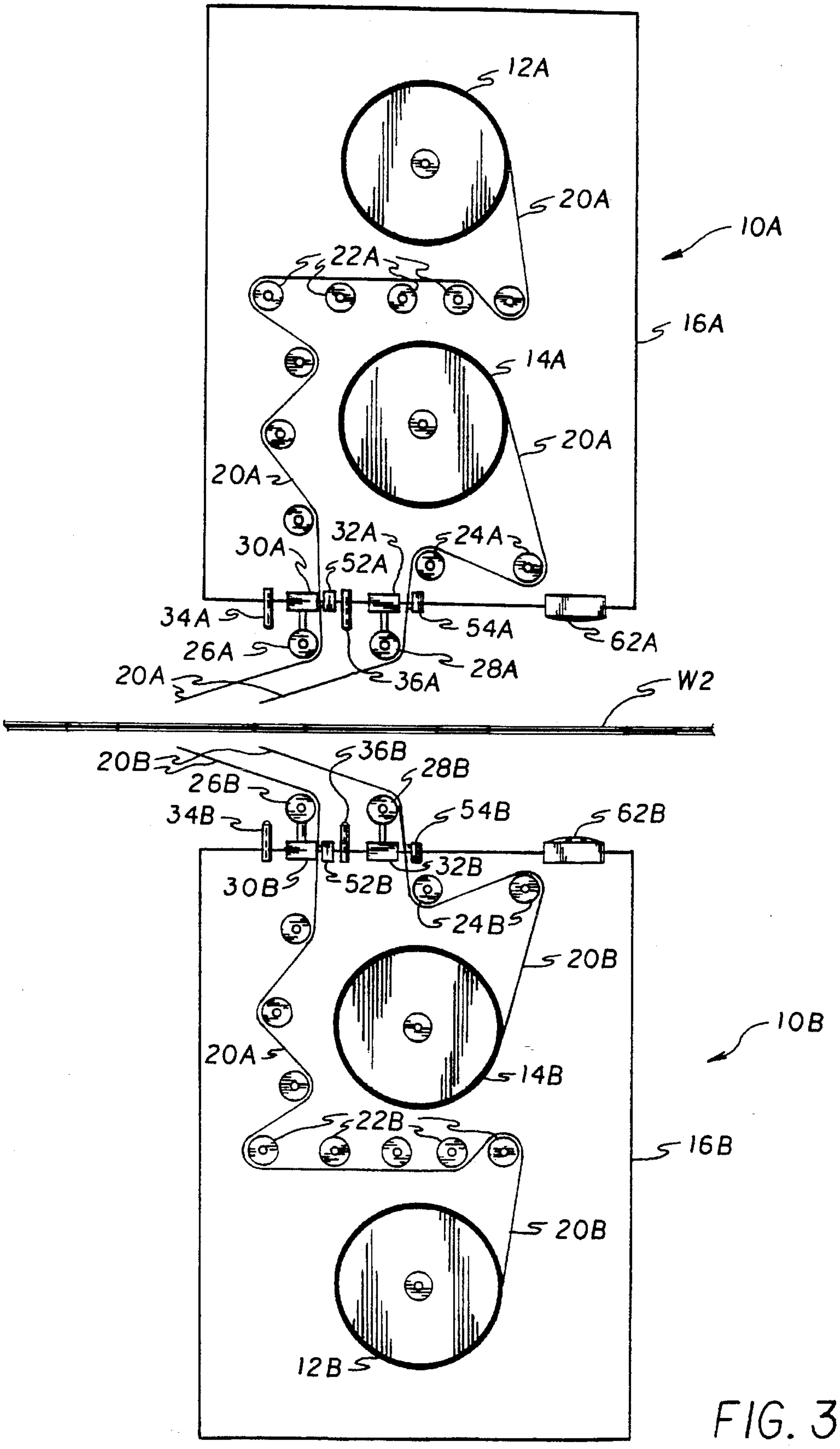
FIG. 3 is a schematic side view of a second embodiment of the present invention, wherein opposite first and second sheets of impermeable material are applied to opposite sides of the web.

FIG. 3 discloses two slurry sealing dispensers, 10a and 10b, positioned on opposite sides of the print web W2. It will be seen that the two dispensers 10*a* and 10*b* are similar to the scent slurry sealing dispenser 10 of FIGS. 1 and 2 discussed above, but are essentially mirror images of one another. Accordingly, the components are described using similar callouts, using the suffixes a and b to designate the upper and lower components as appropriate.

Figure 4:
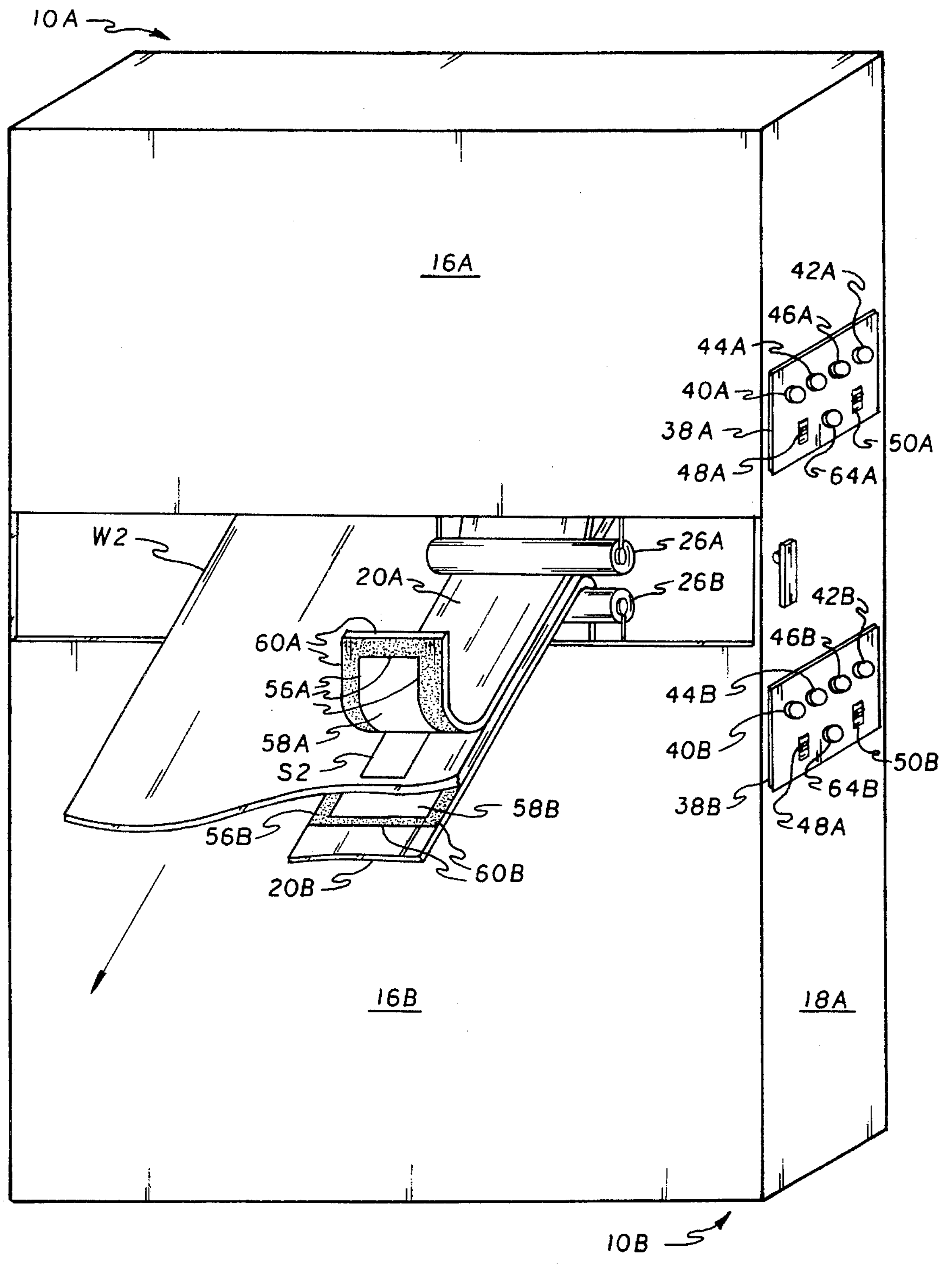
FIG. 4 is a perspective view of a third embodiment which is a modification of the dispensing cabinet of the embodiment of FIG. 3.

Dispensers 10*a* and 10*b* each respectively, include a first sheet dispensing spool 12*a*/12*b* and a second sheet dispensing spool 14*a*/14*b*, installed vertically one above the other on fixed axes within cabinets 16*a*/16*b*. These cabinets 16*a*/16*b* as a third embodiment may be structurally combined, as shown in FIG. 4. Spools 12*a*/12*b* and 14*a*/14*b* are accessible from the front of dispenser 10*a*/10*b* by means of a door 18*a*, shown in its entirety in FIG. 4.

Spools 12*a*/12*b* and 14*a*/14*b* each contain a roll of scent impervious sheet material 20*a*/20*b*, which is respectively dispensed from either spool 12*a*/12*b* or 14*a*/14*b* as needed by means of first dispensing rollers 22*a*/22*b* and second dispensing rollers 24*a*/24*b*. Impervious sheet material 20*a* is applied to the upper or first surface of the web W2 from either spool 12*a* or 14*a*, while the impervious sheet material 20*b* is applied to the opposite lower or second side or surface of the web W2.

Dispensing rollers 22*a*/22*b* and 24*a*/24*b*, respectively, serve to regulate the passage of impervious sheet 20*a*/20*b* from either the first spool 12*a*/12*b* or the second spool 14*a*/14*b*, as appropriate, to the first and second application rollers, respectively, 26*a*/26*b* and 28*a*/28*b*, best shown in FIG. 3. Adjustment means 30*a*/30*b* and 32*a*/32*b* are respectively provided for the adjustment of the first and second application rollers 26*a*/26*b* and 28*a*/28*b*, in the manner of the adjustment means 30 of the first embodiment discussed above.

The feed of sheet material 20*a*/20*b* from either the first spool 12*a*/12*b* or the second spool 14*a*/14*b* is controlled, respectively, by means of a first sensor 34*a*/34*b* and a second sensor 36*a*/36*b*, which sensors 34*a*/34*b* and 36*a*/36*b*, respectively, determine when the impervious material 20*a*/20*b* is depleted from either the first or second spool 12*a*/12*b* or 14*a*/14*b*, depending upon the side of the web W2 to which the impervious material is being dispensed. Sensor operation may use similar means as that used for the first embodiment discussed above.

A control panel 38*a*/38*b*, shown on the cabinet door 18*a* in FIG. 4, is provided for an operator to control the operation of dispenser 10*a* and the dispensing of the impervious sheets 20*a*/20*b*, and contains first and second splice indicators 40*a*/40*b* and 42*a*/42*b*, first and second sheet detector indicators 44*a*/44*b* and 46*a*/46*b*, and first and second power switches 48*a*/48*b* and 50*a*/50*b*, with each first and second indicator or switch, respectively, relating to the first or second spool 12*a*/12*b* or 14*a*/14*b*. Cutting knives 52*a*/52*b* and 54*a*/54*b* (FIG. 3) are provided to, respectively, cut and trim the ends of the first roll of material 12*a*/12*b* or the second roll 14*a*/14*b*, when each respective roll is depleted. Knives 52*a*/52*b* or 54*a*/54*b* may be activated simultaneously with the start up and shutdown of the first or second rolls 12*a*/12*b* and 14*a*/14*b*. Finally, as in the case of the dispenser 10 of the first embodiment discussed above. Break detectors 62*a*/62*b* and break warning lights 64*a*/64*b* are provided in the event of separation of the web W2.

The operation of the dispenser 10*a*/10*b* is similar to that of the dispenser 10 of FIG. 1 and 2, described further above. However, the dual dispensers 10*a* and 10*b* provide for the simultaneous application of two opposite impervious sheets 20*a* and 20*b* in registry to the opposite sides or surfaces of a web W2, as shown in FIG. 4 of the drawings. In FIG. 4, a web or sheet of printed or other material W2 traverses travel rollers (not shown, but similar to the travel rollers T of FIG. 2) during the printing process as indicated by the directional arrow; applications of scent slurry S2 have already been applied to the web W2 as indicated. Impervious sheet material 20*a* (on the upper surface or side of the web W2) and 20*b* (on the opposite lower surface of the web W2) of appropriate width (i.e., sufficient to laterally span the applied slurry areas S2 with a margin) is dispensed from the sheet dispenser 10*a*/10*b*, which dispenser 10*a*/10*b* is installed similarly to the dispenser 10 discussed above in an appropriate place along the production line and downstream of the point of application of the scent slurry S2 to the web W2. Sheets 20*a* and 20*b* will have had a pattern of adhesive 56*a*/56*b*, such as a double-sided tape, or other adhesive means applied to the mating sides 58*a*/58*b*, respectively, of the sheets 20*a*/20*b* along the peripheral edges 60*a*/60*b* thereof and positioned so as to be in registry with the applied slurry S2, prior to winding upon the spool 12*a*/12*b* or 14*a*/14*b*. It will be understood that the application of sheets 20*a*/20*b* to web W2 is a continuous process, and that the sheets 20*a*/20*b* and web W2 will be in continuous facing registry with one another. The sheet 20*a* is shown lifted from the web W2 in FIG. 4 in order to show the applied slurry S2 and the peripheral adhesive means 56*a* are in registry with and facing the applied slurry S2. It will be further understood that the adhesive means 56*a* is positioned to adhere to the web W2 immediately adjacent to the edge of the slurry area S2, and is not adhered to the slurry S2 itself. The impervious sheet 20*b* and its adhesive means 60*b* will be applied to the side of the web W2 opposite that of the slurry S2 and in registry with the sheet 20*a* and adhesive 60*a*, so as to sandwich the slurry application S2 between the two impervious sheets 20*a*/20*b*, to completely seal the slurried portion of the web W2 and all microencapsulations, chemicals, scents, and the like thereon, between the two sheets 20*a*/20*b*.

Figure 5:
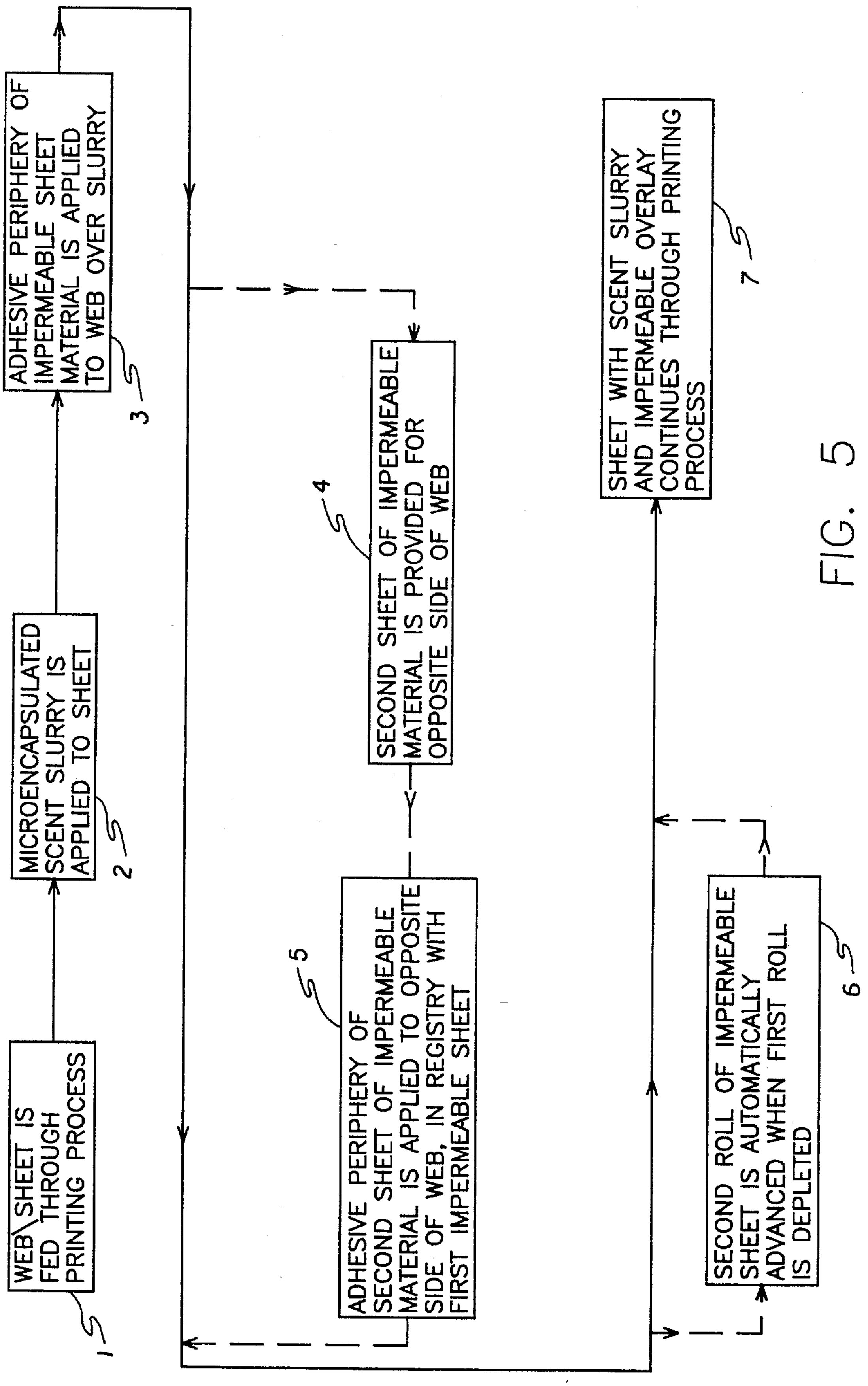
FIG. 5 is a flow chart illustrating the steps of the method of the present invention.

FIG. 5 discloses the method of the present invention by means of a flow chart showing the steps of the present invention. The method of the present invention is incorporated within the printing process, which may be considered to begin with the first step 1 of FIG. 5, of feeding the web or sheet material through the apparatus of the printing plant. The second step 2 of the process includes the application of the scent slurry to the printed sheet or page(s). While such scent slurry is almost universally microencapsulated in order to contain the scent, invariably at least some of the microcapsules are damaged during the printing and distribution process, before reaching the hands of the consumer.

Accordingly, the present invention provides for the sealing of the applied slurry by means of the application of an impermeable overlay sheet over the scent slurry coating on the sheet material, as indicated in the third step 3 of FIG. 5. Preferably, the impermeable sheet is secured to the web by a peripheral adhesive on the impervious sheet so as not to adhere directly to the slurry but merely to cover it with an impervious barrier, as discussed above in the detailed discussion of the apparatus of the present invention. Once the impermeable overlay has been applied, the process continues as indicated by the steps in FIG. 5.

In many cases, however, the application of a single impermeable sheet to one side or surface of the web is insufficient, and scents, chemicals, etc., either those used in the printing process or in the slurry itself, may permeate or "bleed through" the web material, particularly in the case of standard printed paper web material. Accordingly, it may be desirable to provide a second sheet of impervious material adhesively secured to the opposite side of the web from that having the slurry thereon, and in registry with the slurry application and the first impermeable sheet, as indicated by the optional steps 4 and 5 of FIG. 5.

It is important that any printing or similar process provide for a minimum of down-time for the production line. Accordingly, the apparatus of the present invention provides for a second or backup spool of overlay material, which second spool is spliced to the end of the primary spool when that primary spool is depleted in order to continue the dispensing of the overlay material without significant interruption. Another spool of overlay material is then installed in place of the depleted spool, as shown in the supplemental step 6 of FIG. 5. The printing process continues as indicated by the final step 7 of FIG. 5, after the scent slurry has been sealed by means of the method of step 3 of FIG. 5 and a second spool of impermeable overlay material has been advanced as needed from time to time, as indicated in step 6 of FIG. 5.

In accordance with the above, a method and apparatus is disclosed which provides for the impervious sealing of microencapsulated or other scent slurry which is applied to a printed web of material during the printing process. The present invention imperviously seals such scent slurry on the page or sheet, thus preventing the mixing of the scent with other odors such as fresh ink or paper and the resulting unpleasant combination of scent which may arise. Further, the present invention provides persons with freedom of choice as to whether or not they wish to partake of the scent, thus allowing those with potential allergic or other reactions to some of the chemicals used in such scent slurries to avoid exposure to those chemicals. Finally, the present invention prevents inadvertent damage to the microencapsulations, thus providing them with their full effect when a person desires to experience the scent provided.

It is to be understood that the present invention is not limited to the sole embodiment described above, but encompasses any and all embodiments within the scope of the following claims.

I claim:

1. A method of imperviously sealing a scent slurry on a continuous web of material from two sheets of impervious material confined in a cabinet during a printing process comprising the following steps:

providing a continuous web of material having a first surface and an opposite second surface during a printing process;

applying a scent slurry to preselected areas on the first surface of the web of material;

providing a cabinet adjacent to said continuous web of material including a first and second spool means, respectively having a continuous first sheet and a second sheet of impervious material rolled thereon for the dispensing of the sheet of impervious material;

continually applying the first sheet of impervious material in an overlying manner to the first surface of the web of material; and adhesively sealing the periphery of the first sheet of impervious material to the first surface of the web of material so that the area of slurry on the first surface of the web of material is completely contained within the sealed periphery of the first sheet of impervious material, thereby imperviously sealing the slurry beneath the first sheet of impervious material; and continually applying the second sheet of impervious material over the second surface of the web of material to imperviously seal the periphery of said second sheet and sandwich the scent slurry on the web of material between said first continuous sheet of material and said second continuous sheet of material.

2. The method of claim 1 including:

providing a spool means comprising a primary and a secondary spool of said first second continuous sheets of impervious material, and;

splicing the secondary spool of impervious material to an end of the primary spool of impervious material when the primary spool of impervious material is depleted.

3. The method of claim 1 including:

providing double-sided tape along the periphery of the sheet of impervious material for the adhesive sealing of the periphery of the sheet of impervious material overlying the scent slurry on the web material.

4. The method of claim 1, wherein the material of said two sheets of impervious material is selected from the group consisting of aluminum foil, and plastic.

5. The method of claim 4, wherein the material of said two sheets of impervious material is aluminum foil.

6. The method of claim 4, wherein the material of said two sheets of plastic impervious material is polyethylene plastic.

7. A method of imperviously sealing a scent slurry on a continuous web of material from two sheets of impervious material confined in two separate cabinets during a printing process comprising the following steps:

providing a continuous web of material having a first surface and an opposite second surface during a printing process;

applying a scent slurry to preselected areas on the first surface of the web of material;

providing one cabinet above said continuous web of material including a first spool means having a first continuous sheet of impervious material rolled thereon for the dispensing of the first sheet of impervious material;

continually applying the first sheet of impervious material in an overlying manner to the first surface of the web of material;

adhesively sealing the periphery of the first sheet of impervious material to the first surface of the web of material so that the area of slurry on the first surface of the web of material is completely contained within the sealed periphery of the first sheet of impervious material, thereby imperviously sealing the slurry beneath the first sheet of impervious material;

providing a second spool means having a second continuous sheet of impervious material rolled thereon for the dispensing of the second sheet of impervious material from a second separate cabinet positioned vertically below said first cabinet and said continuous web;

continually applying the second sheet of impervious material in an underlying manner to the second surface of the web of material; and, adhesively sealing the periphery of the second sheet of impervious material to the second surface of the web of material in registry with the first sheet of impervious material, thereby imperviously sandwiching the scent slurry between the first sheet and the second sheet of impervious material.

8. The method of claim 7, wherein the material of said two sheets of impervious material is selected from the group consisting of aluminum foil and plastic.

9. The method of claim 8, wherein the material of said two sheets of impervious plastic material is polyethylene plastic.

10. A dispenser cabinet for continuously dispensing two sheets of impervious material for the sealing of a scent slurry on a continuous web of material having a first surface with a partial coating of a scent slurry thereon and an opposite second surface, with the continuous web of material being continuously transported on travel rollers during a printing process, said dispenser cabinet comprising:

a dispenser cabinet including a first and a second spool means, each respectively having a first and a second continuous sheet of impervious material rolled thereon;

said each first and second continuous sheet of impervious material having a mating surface with opposite peripheral edges including adhesive means thereon providing for the adhesive sealing of said peripheral edges of said each first and second continuous sheet of impervious material to the first and second surfaces of the web of material, with said first continuous sheet of impervious material being applied over the scent slurry on the first surface of the web of material to imperviously seal and cover the scent slurry on the web of material;

and said second continuous sheet of impervious material being applied over the second surface of the web of material to imperviously seal and sandwich the scent slurry on the web of material between said first and second continuous sheets of material;

dispensing roller means providing for the continuous dispensing of each said first and second continuous sheet of impervious material from respective said first and second spool means;

application roller means providing for the continuous application of each said first and second continuous sheet of impervious material onto the web of material, and;

a control means providing for the selective actuation of each said first and second spool means, said dispensing roller means, and said application roller means, whereby, said control means is selectively actuated to operate each said first and second spool means, said dispensing roller means, and said application roller means to continuously dispense each said first and second continuous sheet of impervious material and adhesively secure said periphery of each said first and second continuous sheet of impervious material to the continuous web of material, and to imperviously seal and sandwich the scent slurry on the continuous web of material.

11. The dispenser cabinet of claim 10 wherein:

said each said first spool and second spool means comprises a primary spool and a secondary spool disposed vertically within said dispenser cabinet; and each said primary and secondary spool of each said first and second spool means having fixed axes, whereby each said secondary spool provides a continuing continuous sheet for each said primary spool when depleted.

12. The dispenser cabinet of claim 10 including:

sensor means providing for the sensing of the end of each said continuous sheet of impervious material when each said first and second spool means is depleted.

13. The dispenser cabinet of claim 10 including:

cutting means providing for the cutting of the end of each said continuous sheet of impervious material from said first and second spool means.

14. The dispenser cabinet of claim 10, including:

adjustment means activated by means selected from hydraulic, pneumatic and electrical for said application roller means.

15. The dispenser cabinet of claim 10 including:

means providing for the detection of a break in the web of material and warning means therefor, said break detection means further providing for the stoppage of said dispenser when such break is detected and the activation of said warning means.

16. The dispenser cabinet of claim 10 wherein:

said control means includes one selectively operable switch, one splice indicator light, one break detector indicator light for each said first and second spool means and warning means.

17. The dispenser cabinet of claim 10 wherein:

said adhesive means comprises double-sided adhesive tape applied to said opposite peripheral edges of each said continuous sheet of impervious material prior to the installation of each said continuous sheet of impervious material to said spool means.

18. The dispenser of claim 10 wherein:

said dispenser overlies the travel rollers of the printing process.

* * * * *